United States Patent
Kanerva et al.

[11] Patent Number: 5,930,233
[45] Date of Patent: *Jul. 27, 1999

[54] DATA TRANSMISSION SYSTEM WITH SLIDING-WINDOW DATA FLOW CONTROL

[75] Inventors: Mikko Kanerva, Helsinki; Hannu Kari, Veikkola; Jari Vainikka, Vantaa; Juha-Pekka Ahopelto, Helsinki, all of Finland

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/765,067
[22] PCT Filed: May 8, 1996
[86] PCT No.: PCT/FI96/00260
§ 371 Date: Jan. 6, 1997
§ 102(e) Date: Jan. 6, 1997
[87] PCT Pub. No.: WO96/36154
PCT Pub. Date: Nov. 14, 1996

[30] Foreign Application Priority Data

May 9, 1995 [FI] Finland ................... 952256

[51] Int. Cl.⁶ ................................................. H04J 3/12
[52] U.S. Cl. .................................. 370/231; 370/410
[58] Field of Search .......................... 370/347, 229, 370/235, 236, 310, 410, 464, 465, 468, 498, 503, 516, 517, 522, 216, 345, 231, 394; 371/32, 33; 395/200.62, 200.64

[56] References Cited

U.S. PATENT DOCUMENTS

| | | | |
|---|---|---|---|
| 4,779,274 | 10/1988 | Takahashi et al. | 371/32 |
| 4,841,527 | 6/1989 | Raychaudhuri et al. | 371/32 |
| 4,970,714 | 11/1990 | Chen et al. | 370/216 |
| 5,210,751 | 5/1993 | Onoe et al. | 370/349 |
| 5,563,895 | 10/1996 | Malkamaki et al. | 371/32 |
| 5,586,113 | 12/1996 | Adachi et al. | 370/432 |
| 5,588,000 | 12/1996 | Rickard | 370/428 |
| 5,592,627 | 1/1997 | Burt et al. | 395/200.62 |

FOREIGN PATENT DOCUMENTS

| | | |
|---|---|---|
| 658 028 | 6/1995 | European Pat. Off. . |
| 695 053 | 1/1996 | European Pat. Off. . |
| 2-186733 | 1/1989 | Japan . |
| 2-298133 | 2/1990 | Japan . |
| 6303257 | 10/1994 | Japan . |
| 07015485 | 1/1995 | Japan . |

*Primary Examiner*—Chi H. Pham
*Assistant Examiner*—Kwang B. Yao
*Attorney, Agent, or Firm*—Pillsbury Madison & Sutro LLP

[57] ABSTRACT

In a digital data transmission system using sliding-window flow control with an adjustable window size on a non-transparent data connection whose nominal data transmission rate may vary during the connection, a receiving party delays the transmission of a retransmission request for a missing frame for the duration of a delay, so that the receiving party may ensure that the missing frame has not been moved to be sent later in the same group or in next groups. If the missing frame is received later in the same group or in the next groups within said delay, no retransmission request is sent. If the missing frame is not received by the end of the delay, a retransmission request is sent. This eliminates unnecessary retransmissions due to the wrong frame order, and resulting loading or congestion. This results in a higher throughput on the data connection. If grouping is not being used, retransmission is not delayed unless a delay is needed for another reason.

23 Claims, 3 Drawing Sheets

DATA TRANSMISSION SYSTEM WITH SLIDING-WINDOW DATA FLOW CONTROL

This application is the national phase of international application PCT/FI96/00260 filed May 8, 1996 which designated the U.S.

FIELD OF THE INVENTION

The invention relates to a data transmission system with sliding-window flow control on a non-transparent data connection whose nominal data transmission rate may vary during the connection.

BACKGROUND OF THE INVENTION

In non-transparent asynchronous data transmission on a circuit-switched connection, data is transmitted from a transmitting party A to a receiving party B in frames or "packets". Besides actual user data, the frames comprise both error-detecting and error-correcting bits to enable the receiving party to detect and possibly correct transmission errors. Each frame is also numbered or the order of the frames is indicated by means of another kind of identifier. The correctness of each received frame is tested at the receiving end. If the frame is found correct, the receiving party acknowledges receipt by transmitting the respective frame number or other identifier. If a frame is not found correct (e.g. due to a transmission error), it will not be further processed (but is "discarded"). A negative acknowledgement (e.g. a retransmission request) is sent, for example in case of discontinuity in frame numbering. Let us assume that the correct frame numbering is, for example, 1,2,3,4,5. However, if frame 3 is followed by frame 5, frame 4 is missing and a negative acknowledgement will be sent for frame 4. Once the transmitting end receives a negative acknowledgement or no acknowledgement at all in respect to a given frame, it retransmits the frame a predetermined number of times. The total number of repetitions is limited, so that endless transmission loops are avoided in a very bad connection.

On such a connection, user data throughput varies with the quality of the connection. Deterioration in the quality of the connection results in an increase in the number of incorrect and lost frames, and consequently the number of repetitions.

The frames have to be stored (buffered) at the transmitting end until they have been acknowledged, so that they are available should retransmission be needed. To limit the amount of necessary buffering, a flow control protocol based on a sliding window may be used in the acknowledgement. In accordance with the flow control protocol, the transmitting party A may send a plurality of data frames before requiring acknowledgement from the receiving party. A window represents a sliding sequence of successive frames that have been sent but have not yet been acknowledged (a transmission window). The maximum number of unacknowledged frames equals, window size WS. Party B is also prepared to receive WS frames in a reception window, which is a sliding sequence of successive frames that may be acceptably received. The frames that fit into the respective window but have not arrived in the correct order are gathered into the reception window. Let us assume that frames 1,2,5,6,7 are received. After frames 1 and 2, the window is slid forward, whereas 5, 6 and 7 are stored in the reception window where they wait for the missing frames 3 and 4. Once frames 3 and 4 arrive, the reception window is slid over 3,4,5,6 and 7. When the receiving end acknowledges one or more frames, the reception and transmission windows are slid forward a corresponding number of frames. By means of a sliding window, the nominal data transmission capacity of a transmission channel may be better utilized and a higher throughput may be achieved than in a case when the transmitting end A does not send a new frame until it has received an acknowledgement of the previous frame from the receiving end.

Usually the receiving end B assumes that the frames arrive in the right order, defined by the frame number or other kind of identifier. If a frame is missing, for example frame N, which is deduced from the reception of frame N+M (M>0) immediately after frame N-1, in conventional systems, party B immediately informs party A about the absence of the frame. As a result, party A retransmits frame N and sometimes also starts the transmission sequence from number N even if some later frames had already been sent and received.

Sometimes, the frames may arrive at party B in the wrong order. If frame N has been delayed on the transmission path and party B receives frame N+M (M>0) immediately after frame N-1, party B immediately informs party A about the missing frame N. This results in unnecessary retransmission of frame N, which may cause congestion in the network.

Such a situation may arise in a data transmission system where several frames are sent temporarily grouped together, or if a plurality of semi-independent parallel traffic channels is used. If a frame is missing from a certain group, it may have been moved to another group. A retransmission request for such a delayed frame may, however, be sent or placed in a queue to be sent from party B before the arrival of the next group actually containing the "missing" frame N. If the retransmission request arrives to the party. A after party A has transmitted the group actually containing frame N, party A assumes that party B has not received the frame and retransmits it. This loads the transmission system, and may even mix up the transmission protocol.

An example of data transmission according to the above desired type is non-transparent asynchronous data transmission on a circuit-switched connection in the European digital mobile communication system GSM. In that transmission the sliding-window flow control is Radio Link Protocol RLP in accordance with the GSM specification 04.22.

The most significant factor limiting transmission capacity in mobile communication systems is the traffic channel at the radio interface. For instance the GSM system cannot at present support user data transmission rates higher than 9.6 kbits/s, which is the maximum user data transmission rate for one full-speed GSM traffic channel.

One solution that also enables higher user data transmission rates in mobile communication systems, is disclosed in the Finnish Patent Applications 942190 and 945817 (which were unpublished on the priority date of the present application). In that solution two or more parallel traffic channels (subchannels) on the radio path are allocated for one high-speed data connection. A high-speed data signal is divided into these parallel subchannels at the transmitting end for transmission over the radio path, and reassembled at the receiving end. This allows the offering of data transmission services where the transmission rate may be even eightfold, depending on the number of allocated traffic channels, compared with the the conventional (single-channel) transmission rate. In the GSM system, for instance, a total user data transmission rate of 19.2 kbits/s is achieved by using two-parallel subchannels each supporting rate-adapted 9.6 kbits/s as in the existing non-transparent 9.6 kbits/s bearer services of the GSM system.

Consequently, a non-transparent circuit-switched data connection may comprise a plurality of parallel traffic channels at the radio interface, and the number of traffic channels may vary during the connection. The frames to be sent are divided into N parallel channels in groups of N frames, where N may change during the connection. Thus, the above describe problems of receiving frames in the wrong order are especially problematic on such a multi-channel transmission connection.

SUMMARY OF THE INVENTION

The object of the invention is to alleviate or eliminate the above described problems.

This is achieved with a digital data transmission system comprising a transmitting party, a receiving party, a non-transparent circuit-switched data connection between the transmitting and receiving parties, and a data flow control protocol involving transmission of data frames in a preset order on the data connection, checking the order of received data frames, based on order information included in the frames, acknowledging of properly received data frames, and retransmitting of erroneous or missing data frames. In accordance with the invention, the system is characterized in that the transmitting party (A) is temporarily capable of grouping the data frames, and that the receiving party (B), upon detecting a missing data frame based on order information included in two in succession received data frames, is arranged to send a retransmission request for the missing data frame with a delay ensuring that the missing frame has not already been sent in such a way that, if no retransmission request were made, the thought-to-be-missing frame nevertheless would be received.

In accordance with the invention, a receiving party B in a data transmission system using a sliding-window flow control protocol, delays the transmission of a retransmission request for a missing frame for the duration of a delay D, by means of which party B may ensure that the missing frame has not been moved to be sent later in the same group or in the next groups. If the missing frame is received later in the same group or in the next groups within the respective delay D, no retransmission request is sent. If the missing frame is not received by the time the respective delay D expires, i.e. it is not found in the next groups either, a retransmission request is sent after the delay has expired. This eliminates unnecessary retransmissions due to the wrong frame order, and resulting loading or congestion. This results in a higher throughput on the data connection. If grouping is not being used, retransmission is not delayed unless a delay is needed for another reason.

A temporary feature in data transmission may be that a sequence of N frames is sent rapidly in succession, for instance when N simultaneous and parallel traffic channels have been allocated to a data connection to increase the data transmission rate. According to an embodiment of the invention, the number of retransmissions may in this case be significantly decreased, as the receiving party does not send a retransmission request until, for example, N subsequent frames have been received after the frame was found missing. The retransmission request is sent when frame M+N has been received after the missing frame M, where N is the number of parallel channels (other frames may be missing between M and $M_1N$).

BRIEF DESCRIPTION OF THE DRAWINGS

The invention will be described below with reference to accompanying drawings in which.

DETAILED DESCRIPTION OF PREFERRED EMBODIMENTS OF THE PRESENT INVENTION

The present invention may be employed in all digital data transmission systems using sliding-window flow control with an adjustable window size on a non-transparent data connection whose nominal data transmission rate may vary during the connection.

The present invention is especially suited for data transmission applications in digital mobile communication systems of the TDMA or CDMA type, such as the European digital mobile communication system GSM, DCS1800 (Digital Communication System), a mobile communication system according to the EIA/TIA Interim Standard IS/41.3, etc.

Figure 1:
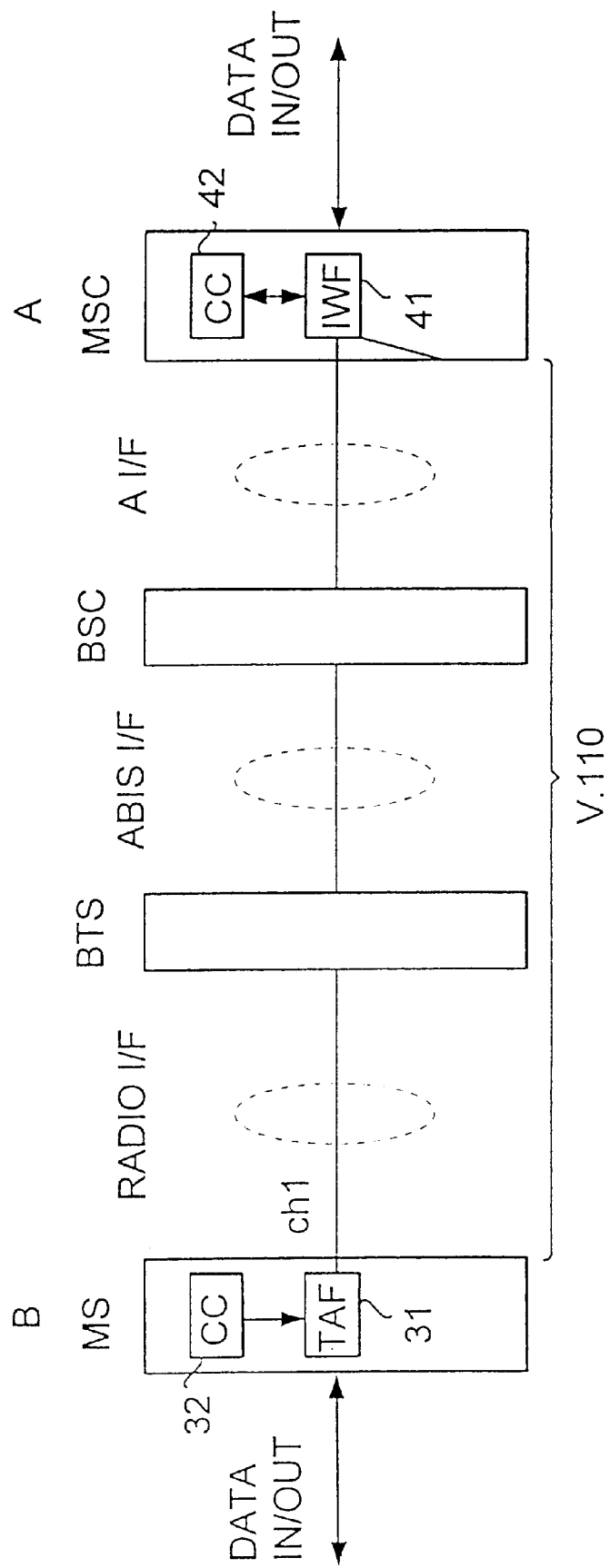
FIG. 1 illustrates a part of a mobile communication system to which the invention may be applied on a single-channel non-transparent connection.

The invention will be described below by using the GSM mobile communication system as an example, without being limited to it. The basic structural parts of the GSM system are shown in FIG. 1, but in this application there is no need to describe their properties or other sections of the system in greater detail. As to a more detailed description of the GSM system, reference is made to the GSM specifications and the book "The GSM System for Mobile Communications", M. Mouly & M. Pautet, Palaiseau, France, 1992, ISBN: 2-9507190-0-7.

A mobile services switching center MSC establishes incoming and outgoing calls. The MSC performs similar tasks as an exchange in the public switched telephone network (PSTN). Moreover, the MSC performs functions typical of mobile telephone traffic only, such as subscriber location management, in cooperation with the subscriber registers of the network (not shown). Mobile stations MS communicate with the MSC via base station systems (BSS). The base station system BSS consists of a base station controller BSC and base transceiver stations BTS.

The GSM system is a time division multiple access (TDMA) system, where traffic on the radio path is time a hyphen divided and occurs in successively repeating TDMA frames, each of which consists of a plurality of time slots. A short information packet is sent in each time slot as a radio frequency burst of finite duration and consisting of a group of modulated bits. Time slots are mainly used to convey control channels and traffic channels. Speech or data is transmitted on the traffic channels. Signalling between a base station and a mobile station takes place on the control channels. The channel structures used at the radio interface of the GSM system are described in more detail in the GSM specification 05.02. In accordance with that specification, one time slot from one of the carrier waves is designated to a mobile station MS as a traffic channel (Single Slot Access) at the beginning of a call. The mobile station MS synchronizes with the time slot to transmit and receive radio frequency bursts.

In the GSM system, a data connection is established between a terminal adaptation function TAF 31 of a mobile station MS and an interworking function IWF 41 (usually in connection with the mobile services switching center MSC) in a fixed network. The data connection is a circuit-switched connection that reserves one (or more) traffic channels from the radio interface for the whole duration of the connection. In the GSM network, the data connection is a V.110 speed-adapted, to V.24 interfaces adaptable, digital connection. The herein described V.110 connection is a digital transmission channel originally designed for ISDN technology (Integrated Services Data Network) that adapts to the V.24 interface and offers a chance to also transmit V.24 statuses (control signals). The CCITT recommendation for a V.110 speed-adapted connection is described in the CCITT Blue Book V.110. The CCITT recommendation for the V.24 interface is presented in the CCITT Blue Book V.24. The terminal adaptation function TAF adapts a data terminal (not shown) connected to a mobile station MS to the V.110 connection, which is established in FIG. 1 over a circuit-switched connection using one traffic channel chi. The interworking function IWF adapts the V.110 connection to another V.110 network, such as an ISDN or another GSM network, or to another transit network, such as the public switched telephone network PSTN.

Data is transmitted between the terminal adaptation function TAF and the interworking function IWF in frames or "packets", using sliding-window flow control with an adjustable window size. This sliding-window flow control is the Radio Link Protocol (RLP) according to the GSM specification 04.22. Data transmission between the interworking function IWF according to the protocol will be described below under the assumption that the interworking function IWF is the transmitting party A and the terminal adaptation function TAF is the receiving party B. It should, be noted, however that data transmission takes place similarly even in the opposite direction, TAF-IWF.

In non-transparent asynchronous data transmission on a circuit-switched connection, data is transmitted from a transmitting party A to a receiving party B in frames or "packets". An example of such frames is disclosed in the GSM specification 04.22. Besides actual user data, the frames comprise error-detecting bits to enable the receiving party to detect transmission errors. Each frame is also numbered, or the order of the frames is indicated by means of another kind of identifier. Party A stores, i.e. buffers, the transmitted frame until receipt from party B of an acknowledgement of successful receipt of the frame. Party B tests the correctness of each received frame. If the frame is found to be correct, the receiving party acknowledges receipt by transmitting the respective frame number or other identifier. If the frame is not found correct (e.g. due to a transmission error), it will not be further processed (but is "discarded"). A negative acknowledgement (e.g. a retransmission request) is sent, for example, in case of discontinuity in frame numbering. Let us assume, for example, that a correct frame numbering is 1,2,3,4,5. However, if frame 3 is followed by frame 5, frame 4 has been left out and a negative acknowledgement will be sent for frame 4. Once party A receives a negative acknowledgement, or no acknowledgement at all, party A retransmits frame 4 until an acknowledgement is received or a predetermined the maximum number of retransmissions is reached. The total number of repetitions is limited so that endless transmission loops are avoided in a very bad connection.

The transmitting party A may transmit a plurality of data frames and buffer them before requiring acknowledgement from the receiving party B. This sliding sequence of successive frames that have been sent but not yet acknowledged, is called a sliding transmission window. The maximum number of unacknowledged frames equals the window size WS. In the same way, the receiving party B is prepared to receive WS frames in a reception window, which is a sliding sequence of successive frames that can be acceptably received. The frames that fit into the reception window but have not arrived in the correct order are gathered into the reception window. Let us assume that frames are received in the order 1,2,5,6,7. After frames 1 and 2 the window is slid forward, whereas frames 5, 6 and 7 are stored in the reception window where they wait for the missing frames 3 and 4. Once frames 3 and 4 arrive, the reception window is slid over 3,4,5,6 and 7. When the receiving end acknowledges one or more frames, the reception and transmission windows are slid forward a corresponding number of frames. By means of a sliding window, the nominal data transmission capacity of the transmission channel may be better utilized and a higher throughput may be achieved than when the transmitting end A does not send a new frame until it has received an acknowledgement of the previous frame from the receiving end.

Usually the receiving party B assumes that the frames arrive in the right order, as defined by the frame numbers or other kind of identifiers. As stated above, the processing performed by the transmitting party and various transmission delays in a multi-channel data connection, for example, may change the order of the received frames. In this case, an immediate retransmission request for a missing frame used in a mobile communication system in accordance with the GSM specifications, for instance, causes unnecessary loading and decrease in throughput, and can cause congestion.

This is eliminated by means of an arrangement in accordance with an embodiment of the invention, where the receiving party B delays the transmission of a retransmission request for a missing frame for the duration of delay D, so that party B may make sure that the missing frame has not been sent later. The retransmission request may also be delayed until the reception of a frame whose number is E times higher (E>0, typically E=N, where N= the number of parallel channels). If the missing frame is found in the next received group, no retransmission request is sent. If the missing frame is not found in the next group, a retransmission request is sent with delay D. This eliminates unnecessary retransmissions due to the wrong frame order, and the resulting loading or congestion. The result is a higher throughput on the data connection. If grouping is not being used, retransmission is not delayed, unless a delay is needed for another purpose.

A temporary feature in data transmission may be that a sequence of N frames is sent rapidly in succession, for instance when N simultaneous and parallel traffic channels have been allocated to a data connection to increase the data transmission rate. The number of retransmissions may in this case be significantly decreased, because the receiving party does not send a retransmission request until, for example, N later frames, i.e. a new group of frames, have been received after the frame was found missing.

Finnish Patent applications 942190 and 945817 disclose a procedure where a mobile station MS that needs higher-rate data transmission than one traffic channel (9600 bits/s) can offer, is assigned two or more time slots in the same TDMA frame. The maximum user data transmission rate of a multi-channel data connection is the number of parallel traffic channels x the user data transmission rate 9600 bits/s of one traffic channel. In this way, the user rate 19200 bits/s, for instance, may be supplied on two traffic channels as a minimum. This procedure is presented as one example of a manner of embodying high-rate data transmission based on a plurality of parallel traffic channels in a radio system. Regarding the details of this procedure, reference is made to those Finnish patent applications. It must, however, be noted that as to the invention, the only essential requirement is that it is possible to establish a multi-channel transmission connection, and the invention is solely directed at the adjustment of delay D at the receiving end B, as the transmission capacity of such a multi-channel connection is changed by increasing or decreasing the number of traffic channels.

Figure 2:
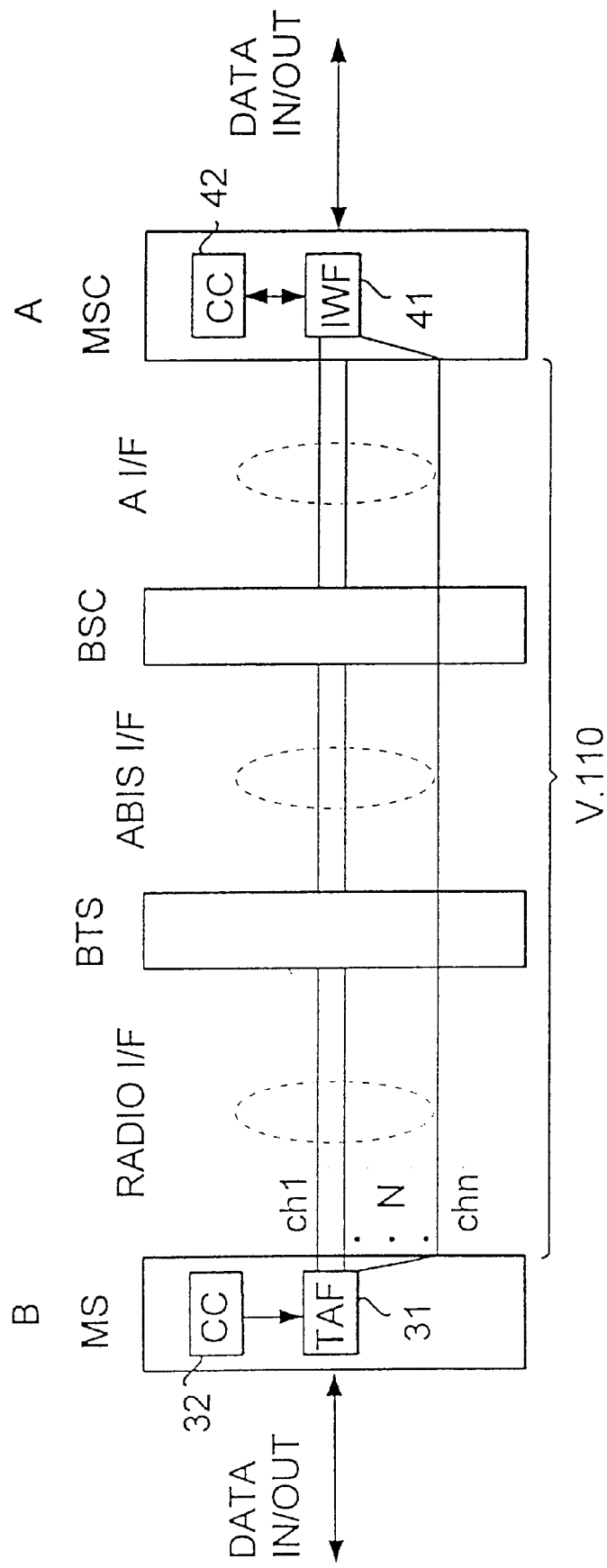
FIG. 2 illustrates a part of a mobile communication system to which the invention may be applied on a multi-channel non-transparent connection.

FIG. 2 illustrates the architecture of the GSM network that embodies a data transmission service using such a group of multiple parallel traffic channels. FIG. 2 is identical to FIG. 1 except that in FIG. 2 a circuit-switched non-transparent connection comprising N parallel traffic channels ch1-chn, where N=1,2, . . . , exists between the terminal adaptation function TAF and the interworking function IWF. In a mobile station, the network termination 31 operates as a divider that divides a high-rate data signal. DATA IN received from data terminal equipment into parallel traffic channels ch1-chn, and as a combiner that combines low-rate partial signals received from parallel traffic channels ch1-chn into a high-rate data signal DATA OUT. Correspondingly, at the other end of a multi-channel data connection, the interworking function IWF operates as a divider that divides an incoming high-rate data signal DATA IN into parallel traffic channels ch1-chn, and as a combiner that combines low-rate partial signals received from parallel traffic channels ch1-chn into a high-rate data signal DATA OUT.

On a multi-channel data connection, a temporary feature of the data connection is that N frames are sent rapidly in succession via N parallel traffic channels, i.e. in a group of N frames. Moreover, the grouping may change during the data connection as the transmission capacity of the data connection changes. Changing the nominal transmission capacity may involve changing the number of radio channels allocated to the connection or changing the nominal transmission rate of one or more traffic channels. Traffic channels are typically allocated and deallocated, i.e. added to or removed from a data connection, by the mobile services switching center MSC, preferably its call control unit 42, which then signals the information on the allocated traffic channels to the mobile station MS, preferably to its call control 32. From the point of view of the invention, the procedure for allocating traffic channels to a data connection, or the unit or function participating in the allocation, is not essential. As far as the invention is concerned, it is only essential that the receiving party B (IWF or TAF) is either directly or indirectly provided with information on delay D being used, for example information on the grouping of frames used by the transmitting party A at each specific time, or information permitting the deduction of the frame grouping used, for example the number of traffic channels allocated to the data connection. In the example shown in FIG. 2, the call control unit 42 transmits information on the nominal transmission capacity used at each specific time to IWF and the call control unit 32 to TAF. IWF and TAF will adapt delay D according to the transmission capacity in use. Alternatively, the parties to the data transmission may negotiate, for example, about the length of the delay time.

Figure 3:
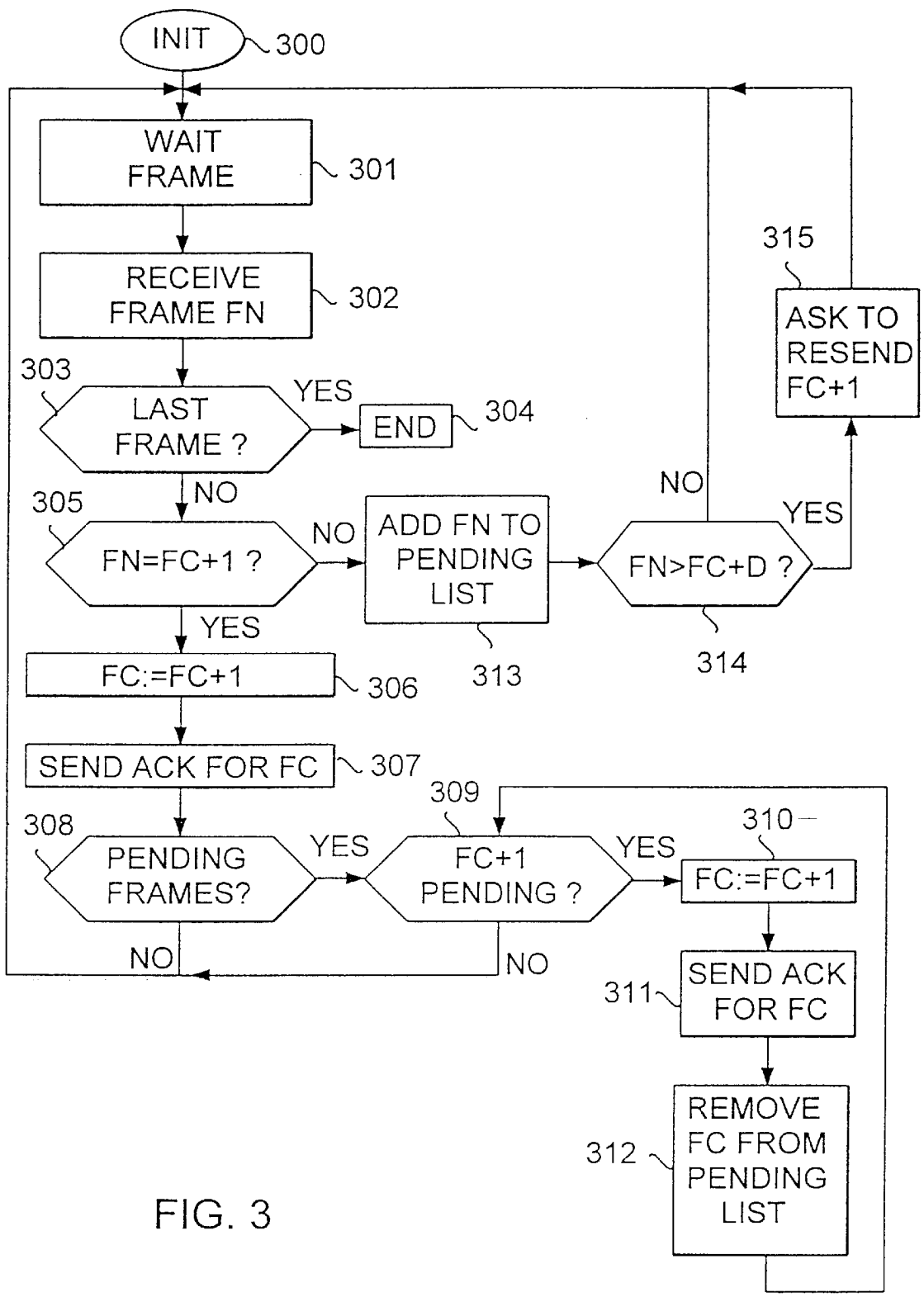
FIG. 3 is a flow chart illustrating a manner in accordance with the invention of delaying the transmission of a retransmission request when the receiving party observes a missing frame.

FIG. 3 shows a flow chart illustrating an example of a procedure with which the delay according to the invention may be realized in a terminal adaptation function TAF or an interworking function IWF.

In FIG. 3, FN is a frame number obtained from a received frame; FC is a frame counter; and D is a delay according to the invention, i.e. D frames. In the example of FIG. 3, it is assumed that the correct frame transmission and reception order conforms to the frame numbering.

In step 300, the data connection is initialized or the transmitting party changes the grouping. The receiving party B receives information on the grouping or information based on which it may deduce the grouping and delay D, such as the number of traffic channels.

In step 301, a frame is anticipated and in step 302, frame FN is received. In step 303, checking is performed to see if the frame contains information indicating that this is the last frame of the data connection. If yes, reception is ended in step 304. Information regarding the end of a connection may alternatively be received by other, means than in a data frame.

If the frame is not the last one, the next step is 305. In step 305, it is checked to see if the frame number FN of the received frame is the reading of the frame counter FC increased by one. If FN is not FC+1, frame FN was not received in the right order. In this case, frame FN is added to the list of unacknowledged frames. This list includes all frames that have been received but have not been acknowledged to the transmitting party A, because as they have arrived in the wrong order. Step 313 is followed by step 314.

In step 314, checking is performed to see if the frame number FN is higher than the sum of the frame counter FC and delay D according to the invention. If FN>FC+D, the duration of D frames has elapsed since FC+1 should have been received. Consequently, the next step is 315, where party B sends a retransmission request for frame FC+1 to party A. Thereafter follows step 301, where a new frame is anticipated. If $FN \geq FC+D$, the delay according to the invention has not yet elapsed, and therefore the next step is 301, where a new frame is anticipated.

If the frame number FN=FC+1 in step 305, i.e. the frame was received in the right order, the next step is 306, where the frame counter is increased by one. Then, party B sends an acknowledgement of frame FC (equal to FN) to party A.

Next, in step 308, checking is performed to see if frames exist on the list of unacknowledged frames. If not, the process returns to step 301 to anticipate a new frame. If yes, the next step is 309.

In step 309, checking is performed to see if frame FC+1 is on the list of unacknowledged frames. If not, the process returns to step 301 to anticipate a frame. If yes, the next step is 310.

In step 310, the frame counter FC is increased, and then party B sends an acknowledgement of frame FC+1 to party A in step 311 and removes frame FC+1 from the list of unacknowledged frames in step 312. Thereafter the process returns to step 309.

Delay D may also be defined as a number of received frames. For example, a fixed delay time D=30 ms may be defined as a period of time during which seven TDMA frames are received, i.e. the retransmission request will be delayed for seven TDMA frames. The delay is measured by counting the received TDMA frames.

Instead of a frame counter, a timer, for instance, may also be used to measure the delay time D from the instant when a missing frame should have been received. The timer is started when the missing frame is detected. If the missing frame is not received before the timer expires, (within delay D), a retransmission request is sent to party A. If the missing frame is received before the timer expires (within delay D), an acknowledgement is sent to party A. It should be noted, however that as to the basic idea of the invention it is irrelevant whether the sending of a retransmission request is delayed by a frame counter, a timer, or another means.

Even though the invention has been explained with reference to certain embodiments, it will be understood that the description is intended for an example only and changes and modifications may be made to the presented embodiments without departing from the spirit and scope of the invention set forth in the appended claims.

We claim:

1. A digital data transmission system, said system comprising:
   a transmitting party;
   a receiving party;
   a non-transparent circuit-switched data connection between said transmitting and receiving parties for transmitting and receiving data in data frames;
   a data flow control protocol involving transmitting said data frames by said transmitting party in a preset order on said data connection, checking the order of receiving of said data frames by said receiving party, based on order information included in said data frames, acknowledging by said receiving party properly received data frames, and retransmitting erroneous or missing data frames by said transmitting party;
   said transmitting party being capable of temporarily grouping data frames being transmitted; and
   said receiving party being arranged to send, upon detecting a missing data frame, based on order information included in each respective two of said data frames received in succession, a retransmission request for said missing data frame only after a delay of a predetermined duration, wherein said delay of said predetermined duration is for ensuring that said missing frame has not been transmitted in a manner which would result in said missing frame being received by said receiving party subsequent to said receiving party receiving the second of said respective two of said data frames received in succession, if said transmission request was not sent and wherein said predetermined duration of said delay is dependent on said grouping of said data frames by said transmitting party.

2. The system as claimed in claim 1, wherein:
   said predetermined duration of said delay is such that said receiving party is arranged to receive so large number of data frames as to ensure that said missing data frame is not received later in a same group of data frames received or in a subsequent group of data frames received.

3. The system as claimed in claim 1, wherein:
   said transmitting party is arranged to transmit said data frames in groups of N frames per group; and
   said predetermined duration of said delay is on the order of N frames.

4. The system as claimed in claim 1, wherein:
   said data transmission system is a multiple access mobile communication system;
   said data connection comprises at least one of a plurality of traffic channels on a radio path;
   said transmitting party is arranged to provide that said grouping involves sending said data frames via N parallel ones of said traffic channels; and
   said predetermined duration of said delay is on the order of N frames.

5. The system as claimed in claim 1, wherein:
   said predetermined duration of said delay is equal to the time needed for receiving a given number of said data frames by said receiving party.

6. The system as claimed in claim 1, wherein:
   said receiving party is arranged to determine the expiration of said predetermined duration of said delay by counting data frames received from said transmitting party.

7. The system as claimed in claim 1, wherein:
   said transmitting party is a terminal adaptation function in a mobile station; and
   said receiving party is an interworking function in a mobile communication network.

8. The system as claimed in claim 1, wherein:
   said transmitting party is an interworking function in a mobile communication network; and
   said receiving party is a terminal adaptation function in a mobile station.

9. A receiver for a digital data transmission system, said receiver comprising:
   an arrangement for receiving data frames transmitted in a preset nominal order by a transmitting party; and
   an arrangement for sending, upon detecting a missing data frame based on order information in any respective two data frames received in succession, a retransmission request to said transmitting party for said missing data frame, only after expiration of a delay having a predetermined duration, for ensuring that said missing data frame has not been sent after the second data frame in said respective two data frames received in succession, wherein said predetermined duration of said delay is arranged for said receiver to be dependent on and therefore predetermined by the grouping of data frames used by said transmitting party.

10. The receiver as claimed in claim 9, wherein:
    said arrangement for receiving is arranged to receive said transmitted data frames when said transmitted data frames are transmitted in groups; and
    said predetermined duration of said delay corresponds to the time normally adequate for receiving a given number of said data frames, said given number of data frames being sufficiently high to ensure said missing data frame is not received in a current group or in a subsequent group of said data frames.

11. The receiver as claimed in claim 10, wherein:
    said arrangement for receiving is arranged to receive said transmitted data frames when said transmitted data frames are transmitted in groups of N frames; and
    said predetermined duration of said delay is on the order of the time normally adequate for receiving N received data frames.

12. The receiver as claimed in claim 9, wherein:
    said receiver for a multiple access mobile communication system;
    said receiver is arranged to receive data frames over a data connection provided by N parallel traffic channels on a radio path, N being a positive integer; and
    said predetermined duration of said delay is approximately equal to the time normally adequate for receiving N data frames.

13. The receiver as claimed in claim 9, wherein:
    said predetermined duration of said delay is arranged to be predetermined by counting by said receiver of said received data frames until a predetermined number is thereby counted.

14. A data reception method in a digital data transmission system, said method comprising:

receiving by a receiving party data frames transmitted in a present nominal order by a transmitting party;

checking by said receiving party of the actual order of said received data frames, based on order information included in said received data frames;

detecting by said receiving party of a missing data frame based on said order information as included in a respective two of said received data frames which, as actually received by said receiving party, are received in immediate succession;

delaying by said receiving party, sending of a retransmission request in regard to said missing data frame for a delay period of predetermined duration, and sending said retransmission request for said missing data frame only if said missing frame is not received by said receiving party by the end of said delay period, and sending no said retransmission request when said missing frame is received by said receiving party within said delay period; and causing said delay period to depend on the grouping of data frames used for transmitting of data frames by said transmitting party.

15. The method as claimed in claim 14, said method further comprising:

transmitting by said transmitting party said data frames in groups;

setting said delay to correspond to a given number of received data frames, said given number of data frames being sufficiently high to ensure that said missing data frame is not received in a current group or in a subsequent group of said received data frames.

16. The method as claimed in claim 14, said method further comprising:

transmitting by said transmitting party said data frames in groups of N frames per group; and setting said delay period on the order of the time period normally needed for receiving by said receiving party of N said received data frames.

17. The method as claimed in claim 14, wherein said receiver is a receiver for a multiple access mobile communication system, wherein:

said receiving includes receiving data frames over a data connection provided by N parallel traffic channels on a radio path, N being a positive integer; and said delaying includes setting said delay period to be approximately the time period normally needed for receiving by said receiving party of data frames.

18. The method as claimed in claim 14, said method further comprising:

counting off said delay period by said receiving party, by counting said received data frames.

19. A digital data transmission system using sliding-window flow control, said system comprising:

a transmitting party;

a receiving party;

a non-transparent data connection between said transmitting party and said receiving party:

said transmitting party being provided with a capability to temporarily group data frames transmitted by said receiving party in a preset nominal order to said receiving party over said data connection;

said receiving party being arranged to receive said data frames transmitted by said transmitting party;

said receiving party being arranged to check the actual order of said received data frames based on information included in said received data frames;

said receiving party being arranged to send, upon detecting a missing data frame based on said order information in a respective two of said received data frames received in immediate succession, a retransmission request for said missing data frame only after expiration of a delay period which is sufficient for allowing said missing data frame to be received later in a current group of received data frames or in a subsequent group of data frames, in case the order of said received data frames is different from said preset nominal order of the data frames due to grouping by said transmitting party or characteristics of said data connection, wherein said system is arranged to cause said delay period to be defined in duration by counting said received data frames by said receiving party.

20. The system as claimed in claim 19, said system further comprising:

causing said delay period to correspond in duration to the time needed by said receiving party for receiving a given number of said received data frames, said given number of data frames being sufficiently high to ensure that said missing data frame is not received in a current group or in one of a subsequent group of received data frames.

21. The system as claimed in claim 19, wherein:

said transmitting party is arranged to transmit said data frames in groups of N frames per group; and said delay period is of a duration on the order of that normally needed by said receiving party for receiving data frames.

22. The system as claimed in claim 19, wherein:

said receiving party is a receiving party for a multiple access mobile communication system;

said data connection is provided by N parallel traffic channels on a radio path, N being a positive integer; and said delay period is approximately equal to the time normally needed by said receiving party for receiving N data frames.

23. The system as claimed in claim 19, wherein:

said system is arranged to cause said delay period to be dependent in duration on how the data frames transmitted by said transmitting party are groups by said transmitting party.

* * * * *